United States Patent
Weber et al.

(10) Patent No.: US 8,379,813 B2
(45) Date of Patent: Feb. 19, 2013

(54) METHOD AND APPARATUS FOR AUTHORIZING A CALLING CARD TELEPHONE CALL

(75) Inventors: Donald J. Weber, Shrewsbury, NJ (US); Daniel T. Smires, Freehold, NJ (US)

(73) Assignee: Vonage Network LLC, Holmdel, NJ (US)

( * ) Notice: Subject to any disclaimer, the term of this patent is extended or adjusted under 35 U.S.C. 154(b) by 1360 days.

(21) Appl. No.: 11/771,009

(22) Filed: Jun. 29, 2007

(65) Prior Publication Data
US 2008/0112550 A1 May 15, 2008

Related U.S. Application Data

(60) Provisional application No. 60/817,407, filed on Jun. 30, 2006.

(51) Int. Cl.
*H04M 15/00* (2006.01)
*H04M 11/00* (2006.01)

(52) U.S. Cl. .............. 379/114.15; 379/93.02; 379/114.2; 380/44; 726/20; 726/35

(58) Field of Classification Search .......... 379/114.15, 379/114.19, 114.2, 355.03, 355.06, 356.01, 379/357.01, 357.03, 357.04, 357.05, 93.03, 379/114.14, 145; 726/2, 6, 9, 16, 20, 35; 380/43, 44

See application file for complete search history.

(56) References Cited

U.S. PATENT DOCUMENTS

| | | | | | |
|---|---|---|---|---|---|
| 4,742,215 | A | * | 5/1988 | Daughters et al. | 235/487 |
| 5,168,520 | A | * | 12/1992 | Weiss | 713/184 |
| 5,455,857 | A | * | 10/1995 | McGuire | 379/357.03 |
| 5,638,444 | A | * | 6/1997 | Chou et al. | 380/284 |
| 5,764,742 | A | * | 6/1998 | Howard et al. | 379/114.15 |
| 6,799,272 | B1 | * | 9/2004 | Urata | 713/171 |
| 7,086,087 | B1 | * | 8/2006 | Kaminaga et al. | 726/16 |
| 2003/0046590 | A1 | * | 3/2003 | Bender et al. | 713/202 |
| 2008/0175362 | A1 | * | 7/2008 | Bangor et al. | 379/114.01 |

* cited by examiner

*Primary Examiner* — Binh Tieu
(74) *Attorney, Agent, or Firm* — Moser Taboada; Joseph Pagnotta

(57) ABSTRACT

Method and apparatus for authorizing a calling card telephone call are described. In one example, a telephone calling card includes a planar body having a memory system, an input circuit, a controller, and a display. The memory system is configured to store key code information. The input circuit is configured to receive a personal identification number (PIN). The controller is configured to derive a key code from the key code information using the PIN. The display is configured to present the key code. The user may then use the key code for purposes of authorizing a call made using a calling card. The key code may change from time-to-time as the user uses the calling card. Since the user's PIN is not entered into a telephone by the user, the calling card is less susceptible to unauthorized and/or fraudulent use by third parties.

20 Claims, 3 Drawing Sheets

METHOD AND APPARATUS FOR AUTHORIZING A CALLING CARD TELEPHONE CALL

CROSS-REFERENCE TO RELATED APPLICATIONS

This application claims priority to U.S. provisional application Ser. No. 60/817,407, filed Jun. 30, 2006, which is incorporated by reference herein in its entirety.

BACKGROUND OF THE INVENTION

1. Field of the Invention

The present invention relates generally to telephone systems and, more particularly, to a method and apparatus for authorizing a calling card telephone call.

2. Description of the Related Art

The use of telephone calling cards is well known. For example, a customer may receive a telephone card that authorizes telephone call charges to be charged to the customer's account. Typically, the user has to dial a number associated with the calling card processing service and is prompted to dial-in an account number and a personal identification number (PIN) for authentication and authorization purposes. Once the authorization and authentication step is complete, the caller is prompted to dial the called party's telephone number and charges for the call are charged to the customer's account. These types of calling card are susceptible to fraud if the account number and the PIN are disclosed to unauthorized users. One well known fraud technique is to monitor a person making a call using a calling card. By monitoring and recording the numbers being dialed into the phone, a person can determine the numbers which need to be dialed to gain access to the account and thus can make unauthorized telephone calls using the account.

One technique for combating this type of fraud requires the use of a specialized phone having a magnetic card reader. The account and PIN information is embedded in a magnetic strip on the calling card. When a card holder wants to use the calling card, the card is inserted into the magnetic card reader and the account and PIN information can be read. This method of automatically reading the account and PIN information obviates the necessity of the user having to dial this information using the key pad. Therefore, the account and PIN information is not inadvertently disclosed to a third person monitoring the use of the phone by a user. A major disadvantage to this technique, however, is that this calling card can only be used with phones having the capability to read the magnetic strip and it is possible for local phone listening devices to record the account number and pin when the phone converts the magnetic card reader information to dual tone multi-frequency (DTMF) tones, which are sent over the phone line.

Accordingly, there exists a need in the art for a method and apparatus for authorizing a calling card telephone call that prevents fraud and does not require specialized telephone equipment to use.

SUMMARY OF THE INVENTION

An aspect of the invention relates to a telephone calling card apparatus. A planar body includes a memory system, an input circuit, a controller, and a display. The memory system is configured to store key code information. The input circuit is configured to receive a personal identification number (PIN). The controller is configured to derive a key code from the key code information using the PIN. The display is configured to present the key code. The user may then use the key code for purposes of authorizing a call made using a calling card. The key code may change from time-to-time as the user uses the calling card. Since the user's PIN is not entered into a telephone by the user, the calling card is less susceptible to unauthorized and/or fraudulent use by third parties.

Another aspect of the invention relates to processing a telephone call. A request for a call is received using a calling card and a user account. A key code generated by the calling card is received. The key code being derived from key code information stored on the calling card using a PIN associated with the user account. Authorization for the call is verified by validating the key code. A telephone number is requested. The call is then routed based on the telephone number. In some embodiments, the call is placed between first and second endpoints coupled to the public switched telephone network (PSTN). The call is routed over a packet network. In this manner, a call between non-subscribers to voice-over-internet-protocol (VoIP) technology may be handled using VoIP technology.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
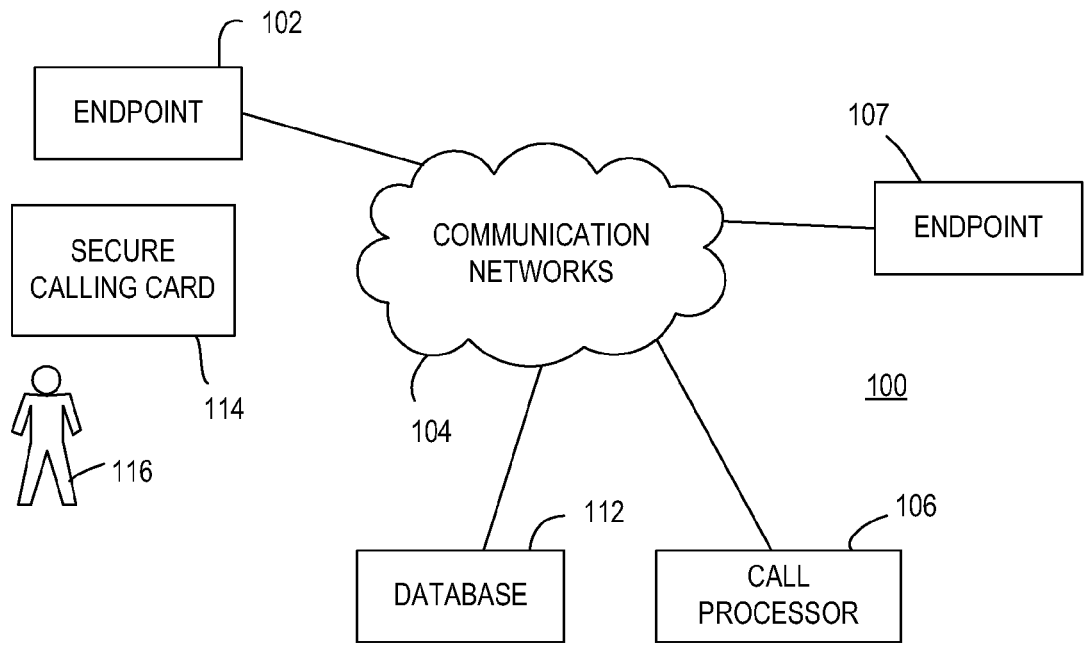
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes an endpoint 102 (also referred to as a first endpoint), one or more communication networks 104, a call processor 106, and an endpoint 107 (also referred to as a second endpoint). The communication networks 104 may include various types of circuit-switched and/or packet networks, which may comprise the public switched telephone network (PSTN), voice-over-internet-protocol (VoIP) networks, the Internet, and the like. A more detailed example of the communication networks 104 is described below with respect to FIG. 4. The endpoints 102 and 107 may include various types of devices capable of making and receiving telephone calls over the communication networks 104, including time division multiplexed (TDM) phone (i.e., a conventional telephone), an internet protocol (IP) phone, a computer, or the like.

The call processor 106 includes various devices and systems for implementing a call processing center. The call processor 106 is configured to perform one or more functions, including the processing of telephone calls made using telephone calling cards. The call processor 106 may be in communication with a database 112 that maintains data associated with calling card accounts. The telephone calling cards handled by the call processor 106 may be conventional calling cards, where users use the cards to make telephone calls that are then billed to the corresponding accounts. Other exemplary telephone calling cards include "pre-paid" calling cards. A pre-paid calling card is associated with an account that is pre-loaded with a block of minutes to be used. A customer purchases the pre-paid calling card for a particular fee. In essence, a user purchases a block of minutes to be used to make telephone calls. As the users make telephone calls, the balance is debited from the associated pre-paid calling cards for the amount of time spent for each call. Some pre-paid calling cards are disposed of when the balance in the account is depleted. Other pre-paid calling cards may be "re-charged" by purchasing additional minutes.

In some embodiments, a call is made from the endpoint 102 to the endpoint 107 using a secure telephone calling card ("secure calling card 114"). The secure calling card 114 obviates the need for a user 116 to dial or otherwise enter private data, such as personal identification number (PIN). Rather, the user inputs a PIN to the secure calling card 114, which in turn outputs a key code. The key code is then used in place of the PIN to authenticate the user for making calls using the secure calling card 114. The key code may change from time-to-time such that a previously generated key code cannot be used to authenticate the secure calling card 114. In this manner, the secure calling card 114 substantially reduces the risk that the private data (e.g., PIN) is illicitly obtained by third parties as the user 116 uses the card. Exemplary embodiments of the secure calling card 114 are described below.

Figure 2:
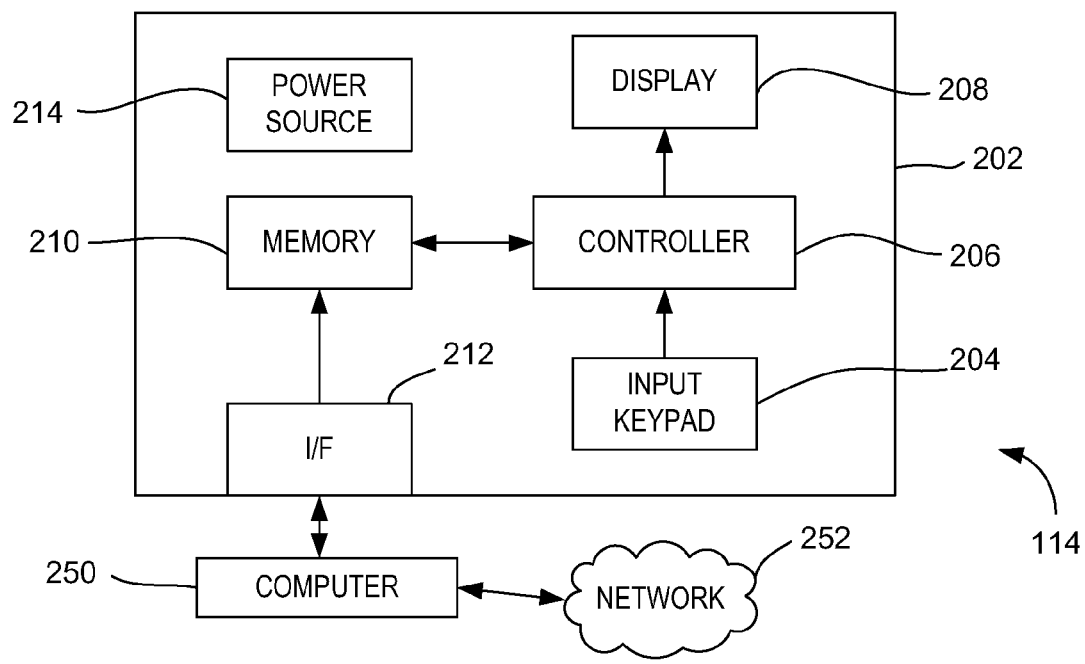
FIG. 2 is a block diagram depicting an exemplary embodiment of the secure calling card in accordance with one or more aspects of the invention

FIG. 2 is a block diagram depicting an exemplary embodiment of the secure calling card 114 in accordance with one or more aspects of the invention. The secure calling card 114 includes a generally planar body 202. The body 202 may be fashioned from plastic, metal, or like-type materials, or a combination of such materials. The body 202 includes an input keypad 204, a controller 206, a display 208, and a memory system 210. The memory system 210 stores key code information from which key codes are derived. In one embodiment, the key code information comprises a plurality of key codes associated with a PIN of a user. Alternatively, the key code information may be mechanism that allows key codes to be generated responsive to a PIN of a user. For example, the key code information may be an algorithm that accepts a PIN as input and outputs a valid key code. The algorithm may be executed by the controller 206. In some embodiments, the memory system 210 comprises a non-volatile memory system, such as a programmable read-only memory (PROM), an erasable PROM (EPROM), an electronically erasable PROM (EEPROM), FLASH memory, or the like. In some embodiments, the memory system 210 may include a removable component, such as a removable FLASH memory card.

The controller 206 may comprise any type of processing element or control logic known in the art. The controller 206 is coupled to receive input from the input keypad 204, and provide output to the display 208. The input keypad 204 may include a plurality of keys corresponding to a respective plurality of alphanumeric characters (e.g., numbers between 1 and 6). A user uses the keypad 204 to enter a PIN, which is then received by the controller 206. The display 208 may comprise any type of display known in the art capable of displaying a sequence of alphanumeric characters, including digital read-out displays, such as liquid crystal displays (LCDs), light emitting diode (LED) displays, and the like. Given an input PIN, the controller 206 obtains a key code associated therewith and provides the key code to the display 208 for presentation to the user.

The controller 206 obtains the key code by accessing the memory system 210 and the key code information stored therein. For example, in some embodiments, a set of key codes is stored in the memory system 210 and associated with a particular PIN. The controller 206 may obtain one of the key codes in a set if the input PIN from the input keypad 204 matches the PIN associated with the set of key codes. In other embodiments, the controller 206 executes an algorithm stored in the memory system 210 to obtain the key code given an input PIN from the input keypad 204. The algorithm may comprise, for example, a cryptographic function or the like that takes a PIN and produces a fixed length alphanumeric output code as a key code. That is, the PIN is used as a "seed" to generate a key code. The algorithm may account for other inputs (seeds) in combination with the PIN, such as time-of-day, to generate the key code. This would assure that the key code changes from time-to-time. In general, the algorithm must be such that the call processing center can recover the user's PIN from the key code or otherwise verify that the entered key code is associated with the user's PIN. For example, the call processing center may execute an inverse of the key code algorithm using the key code (and other data if used to generate the key code) as parametric input. Such algorithms are known in the art.

In some embodiments, the body 202 further includes a communication interface (I/F) 212. The communication interface 212 is coupled to the memory system 210. The communication interface 212 may be used to key code information the memory system 210. The communication interface 212 may comprise any type of communication circuitry known in the art, including any wired interface (e.g., universal serial bus (USB)), wireless interface, or the like.

The secure calling card 114 may be associated with a traditional account or a pre-paid account. The memory system 210 may be updated with new key code information over time. The memory system 210 may be updated using the communication interface 212. For example, the communication interface 212 may be coupled to a computer 250 coupled to a network 252, such as the Internet. In this manner, new or updated key code information may be downloaded from the network 252 through the computer 250 to the secure calling card 114 for storage in the memory system 210. If the memory system 210 includes a removable component, such as a removable FLASH memory chip, the key code information may be updated by inserting a new removable component into the memory system 210. Alternatively, the removable component may be removed, updated, and re-inserted into the memory system 210. Those skilled in the art will appreciate that there are a myriad of possible mechanisms for updating the key code information in the memory system 210.

In some embodiments, the user may connect the secure calling card 114 to a database via the computer 250 and the network 252, such as the database 112 shown in the communication system 100 of FIG. 1. The database 112 may maintain a range of key codes associated with each of a plurality of PINs corresponding to a respective plurality of users. The user may access the database 112 to establish a PIN, which is then associated with a plurality of key codes. The key codes for a given PIN may then be downloaded to the memory system 210 of the secure access card 114 along with the corresponding PIN. In such an embodiment, many different users can use a single access card. Each user establishes a PIN, which is then associated with a plurality of key codes. The key codes and PINs are downloaded to the memory system 210. Each user will generate a unique key code as a function of the user's PIN.

In other embodiments, the user may establish a PIN, as described above, but a set of key codes is not generated. Rather, an algorithm is used to generate key codes "on-the-fly" as the user uses the secure calling card 114. The algorithm may be downloaded into the memory system 210 of the secure access card 114 via the computer 250 and the network 252. In such an embodiment, any customer can use any other customer's secure calling card, as long as the algorithm used is the same across calling cards.

For purposes of clarity by example, the input keypad 204, the controller 206, the display 208, the memory system 210, and the communication interface 212 are shown as separate functional elements. Those skilled in the art will appreciate that one or more of such components may be combined and implemented as a single device, such as an integrated circuit (IC). In any case, the electrical components on the secure calling card 114 are coupled to a power source 214 in the body 202. The power source 214 may comprise any type of power source known in the art, including a battery, solar power cells, or the like.

Figure 3:
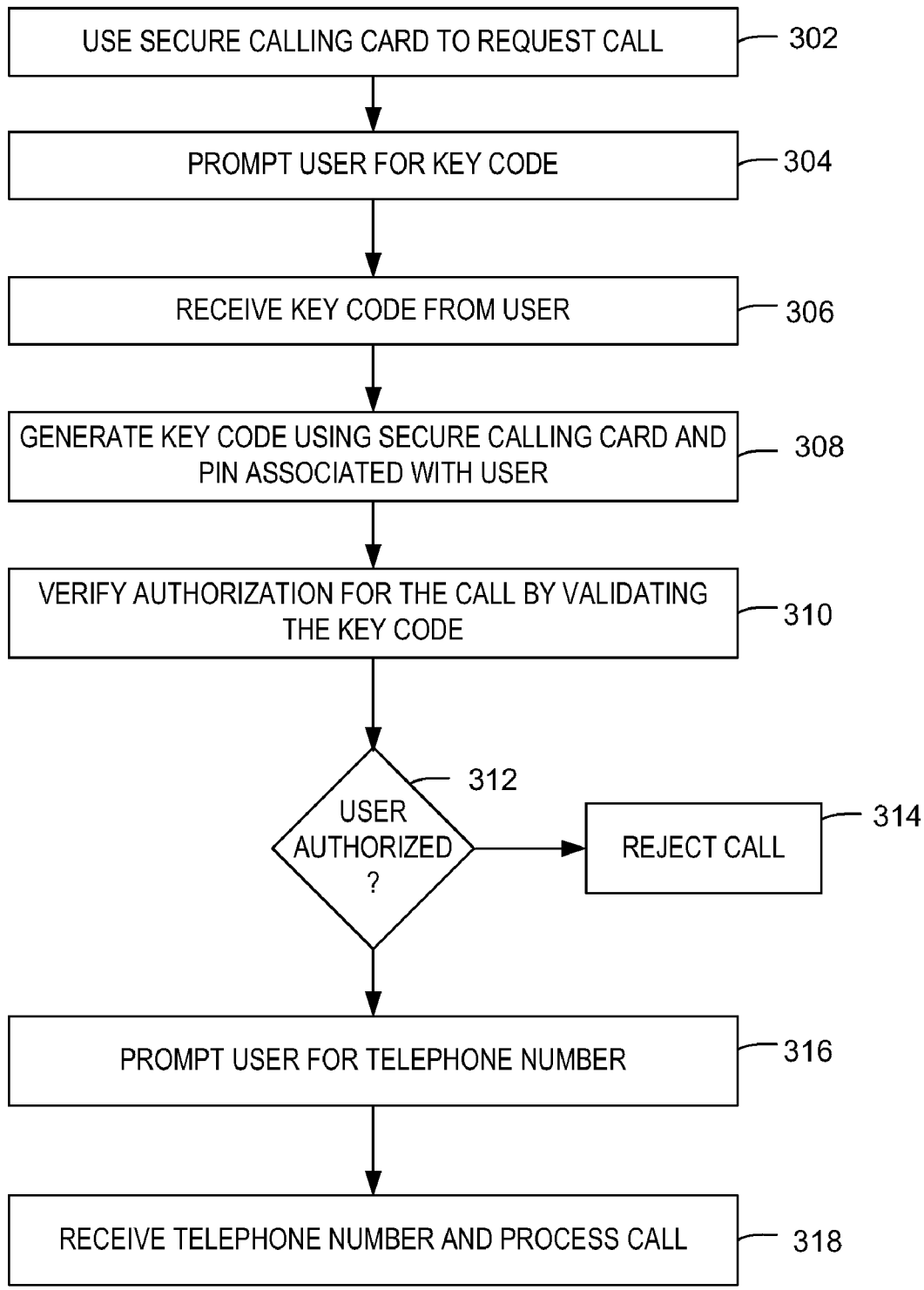
FIG. 3 is a flow diagram depicting an exemplary embodiment of a method of processing a telephone call in accordance with one or more aspects of the invention.

FIG. 3 is a flow diagram depicting an exemplary embodiment of a method 300 of processing a telephone call in accordance with one or more aspects of the invention. The method 300 may be understood with reference to the communication system 100 of FIG. 1. The method 300 begins at step 302, where the user 116 uses the secure calling card 114 to request a call. For example, the user 116 may dial a telephone number of the call processor 106 (e.g., a toll free number). The user 116 may then enter his or her account number or other type of indicia that identifies the user 116 to the call processor 106.

At step 304, the call processor 106 prompts the user 116 for a key code. At step 306, the user 116 generates a key code using the secure calling card 114 and a PIN associated with the user or user account. As described above, the user 116 may generate the key code by inputting a PIN to the secure calling card 114. The secure calling card 114 then derives a key code from key code information stored therein using the PIN (and possibly additional information). The secure calling card 114 then displays the key code to the user 116 so that the user 116 may transmit the key code to the call processor 106.

At step 308, the call processor 306 receives the key code from the user 116. At step 310, the call processor 306 verifies authorization for the call by validating the key code. For example, if the key code was derived from a plurality of key codes associated with the PIN, the call processor 306 may recover a PIN associated with the key code. If the key code was derived from a key code algorithm, the call processor 306 may apply the key code to an inverse of the key code algorithm to recover the PIN. In either case, the call processor 306 verifies that the recovered PIN is indeed associated with the user's account.

At step 312, a determination is made whether the user 116 is authorized to make the call. If not, the method 300 proceeds to step 314, where the call is rejected. Otherwise, the method 300 proceeds to step 316, where the call processor 106 prompts the user 116 for a telephone number. At step 318, the call processor 106 receives the telephone number and routes the call based on the telephone number. For example, the call processor 106 causes the endpoint 107 to indicate an incoming call. If the incoming call is answered at the endpoint 107, the call processor 106 facilitates a connection between the endpoint 102 and the endpoint 107 through the communication networks 104.

Figure 4:
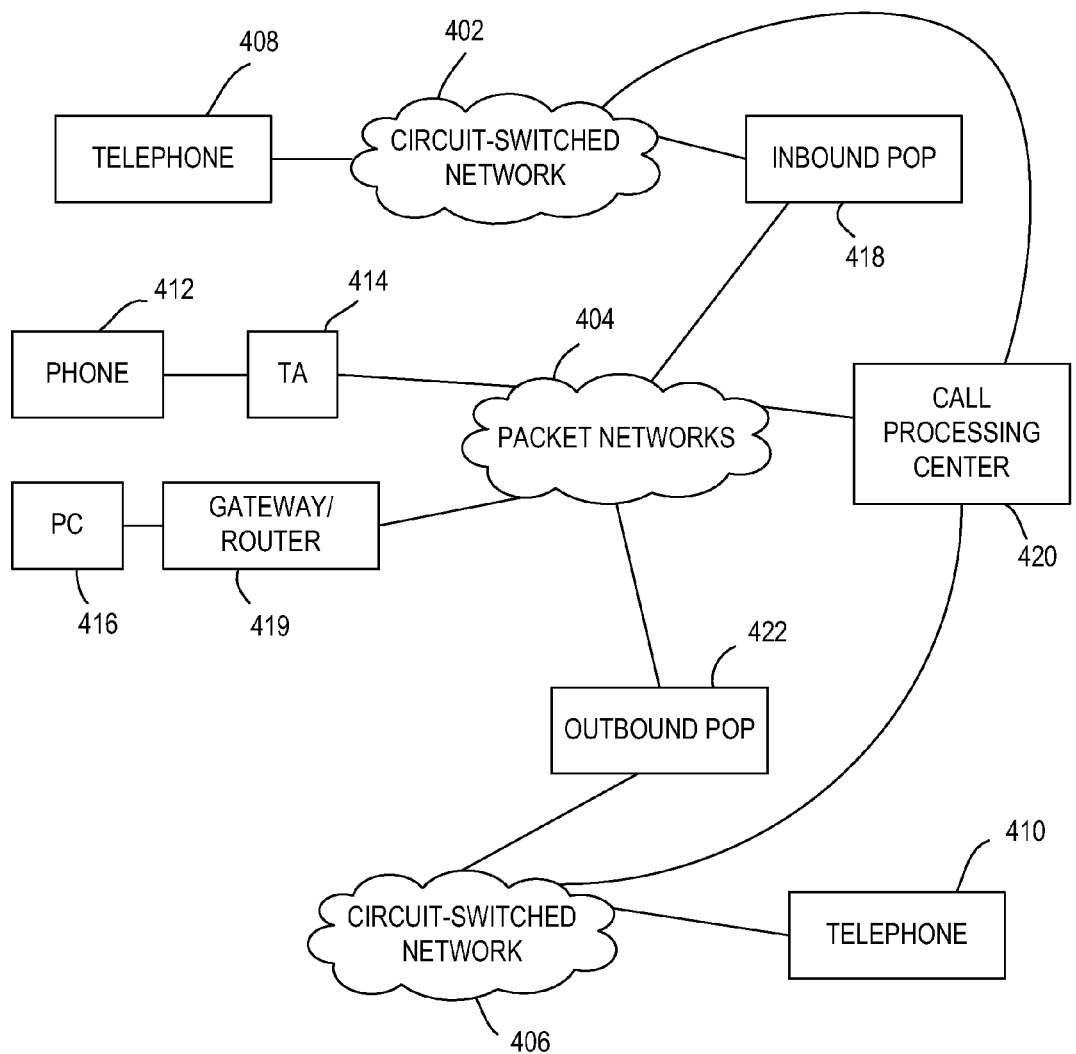
FIG. 4 is a block diagram depicting another exemplary embodiment of a communication system in accordance with one or more aspects of the invention.

FIG. 4 is a block diagram depicting another exemplary embodiment of a communication system 400 in accordance with one or more aspects of the invention. The communication system 400 shows a more detailed embodiment of the communication system 100 of FIG. 1. The communication system 400 includes a circuit-switched network 402, one or more packet networks 404, and a circuit-switched network 406. The circuit-switched networks 402 and 406 may be part of the same network, generally referred to as the PSTN. As is well known in the art, the PSTN comprises a collection of local exchange carriers (LECs) and inter-exchange carriers (IXC). The packet networks 404 may comprise various interconnected internet protocol (IP) networks operated by various entities. At least a portion of the packet networks 404 may be generally referred to as the Internet.

In the present example, a telephone 408 is coupled to the circuit-switched network 402, and a telephone 410 is coupled to the circuit-switched network 406. The telephones 408 and 410 comprise traditional telephones coupled to the PSTN and may be referred to as PSTN telephones. The packet networks 404 are also used to carry telephone calls, such service generally referred to as voice-over-internet-protocol (VoIP). For example, VoIP technology allows users to place telephone calls through the Internet, rather than using the PSTN. In the present example, a telephone 412 is coupled to a terminal adapter (TA) 414, which is in turn coupled to the packet networks 404. One of the functions of the TA 414 is to convert the voice signals to digital data packets for transmission over the packet networks 404. Some phones have built-in terminal adapters and are typically referred to as IP phones.

Also in the present example, a personal computer (PC) 416 is coupled to a gateway/router 419, which is in turn coupled to the packet networks 404. As a PC typically includes a microphone and speaker, the PC 416 can also be used as a telephone and can operate similarly to the telephone 412 and TA 414. The PC 416 performs the function of the TA to covert voice signals to digital data packets for transmission over the packet networks 404. Although telephones and PCs are shown by example, those skilled in the art will appreciate that other types of devices may be used to implement VoIP telephones, such as notebook computers, personal digital assistants (PDAs), and the like.

In some cases, a user of a PSTN telephone will call a user of a VoIP telephone, such as a call between the telephone 408 and the telephone 412 (PSTN-to-VoIP call flow). In such cases, a user of the telephone 408 dials the phone number assigned to user of the telephone 412. The circuit-switched network 402 recognizes the telephone number as a number associated with a VoIP service provider and transmits the call to an inbound point of presence (POP) or regional data center (RDC) ("inbound POP/RDC 418"). The inbound POP/RDC 418 provides an interface between the circuit-switched network 402 and the packet networks 404. The inbound POP/RDC 418 provides the call to a call processing center 420 of the VoIP service provider via the packet networks 404. The call processing center 420 obtains the IP address of the TA 414 associated with the telephone. The call processing center 420 then signals the TA 414 of the incoming call. The signaling between the inbound POP/RDC 418 and the call processing center 420, and between the call processing center 420 and the TA 414, may be performed using various signaling protocols, such as the session initiation protocol (SIP) or the like. If the call is answered at the telephone 412, a voice stream is established between the TA 414 and the inbound POP/RDC 418 over the packet networks 404, such as a real-time transport protocol (RTP) stream or the like. The inbound POP/RDC 418 converts the voice stream for transmission over the circuit-switched network 402 to the telephone 408. At the end of the call, the inbound POP/RDC 418 and the TA 414 signal the call processing center 420 that the call has ended. As a result, the call processing center 420 can determine the appropriate billing information. The above-described call flow is merely exemplary and various details related thereto have been omitted for clarity.

In other cases, a user of a VoIP telephone will call a user of a PSTN telephone, such as a call between the telephone 412 and the telephone 410 (VoIP-to-PSTN call flow). In such cases, a user of the telephone 412 dials the phone number assigned to the user of the telephone 410. The call processing center 420 recognizes the telephone number as being a standard PSTN telephone number and provides the call to an outbound POP or RDC ("outbound POP/RDC 422") via the packet networks 404. The outbound POP/RDC 422 provides an interface between the packet networks 404 and the circuit-switched network 406. The outbound POP/RDC 422 coverts the IP data to time division multiplexed (TDM) format, which is handed off to the circuit-switched network 406. The circuit-switched network 406 then signals the telephone 410 of the incoming call in a conventional manner. The signaling between the outbound POP/RDC 422 and the call processing center 420, and between the call processing center 420 and the TA 414, may be performed using various signaling protocols, such as SIP or the like. If the call is answered at the telephone 410, a voice stream is established between the TA 414 and the outbound POP/RDC 422 over the packet networks 404, such as an RTP stream or the like. At the end of the call, the outbound POP/RDC 422 and the TA 414 signal the call processing center 420 that the call has ended. As a result, the call processing center 420 can determine the appropriate billing information. The above-described call flow is merely exemplary and various details related thereto have been omitted for clarity.

In the above-described call flows, one of the users has subscribed to VoIP technology (e.g., the user of the telephone 412). Users who have not subscribed to VoIP technology have not previously been given the option of using VoIP technology for calls placed to other non-subscribing users. For example, a call between the telephone 402 and the telephone 410 is typically facilitated using only the PSTN (circuit switched networks 404 and 406). In some embodiments of the invention, users of PSTN telephones can selectively use VoIP technology, even when the users are non-subscribers to VoIP technology and are calling other non-subscribers of VoIP technology (e.g., a call between PSTN phones). This may be done using the secure calling card 114.

In particular, a user of a PSTN telephone (e.g., the telephone 402) obtains the secure calling card 114 provided by a VoIP service provider. Assume the VoIP service provider that provides the secure calling card 114 also operates the inbound and outbound POP/RDCs 418 and 422, as well as the call processing center 420. The call processing center 420 is coupled to the PSTN (e.g., the circuit-switched network 404 and/or the circuit switched network 406). Thus, in some embodiments, the call processing center 420 provides a similar function as the POP/RDC, i.e., interfacing between the packet networks 404 and the PSTN. The user then uses the secure calling card 114 as described above in the method 300 of FIG. 3. The call processing center 420 routes a call from the telephone 402 to the called telephone using the packet networks 404. The call processing center 420 receives and packetizes the voice signals from the telephone 402 for transmission over the packet networks 404. If the called telephone is a VoIP telephone (e.g., the telephone 412), the call processing center 420 routes the call to the TA 414 through the packet networks 404, as described above in the PSTN-to-VoIP call flow. If the called telephone is a PSTN telephone (e.g., the telephone 410), the call processing center 420 routes the call to a POP/RDC (e.g., the outbound POP/RDC 422) through the packet networks 404, as described above in the VoIP-to-PSTN call flow. In this manner, a call between two PSTN telephones may be facilitated using the secure calling card 114 and VoIP technology.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A telephone calling card apparatus, comprising:
a planar card body having mounted thereon:
a memory system configured to store key code information;
an input circuit configured to receive a personal identification number (PIN);
a controller configured to derive a key code from the key code information using the PIN; and
a display configured to present the key code, wherein the key code is used at a call processor to authorize a call without transmitting the PIN.

2. The apparatus of claim 1, wherein the memory system comprises a non-volatile memory system.

3. The apparatus of claim 1, wherein the key code information comprises a plurality of key codes associated with the PIN, and wherein the controller is configured to derive the key code by selecting one of the plurality of key codes.

4. The apparatus of claim 1, wherein the key code information comprises a key code algorithm, and wherein the controller is configured to derive the key code by executing the key code algorithm using the PIN as parametric input.

5. The apparatus of claim 4, wherein the controller is configured to execute the key code algorithm using additional data in combination with the PIN as parametric input.

6. The apparatus of claim 1, wherein the planar card body further includes:
a communication interface, coupled to the memory system, configured to receive the key code information for storage in the memory system.

7. The apparatus of claim 1, wherein the input circuit comprises an input keypad, and wherein the display comprises a digital read-out display.

8. A method of processing a telephone call, comprising:
receiving a request for a call using a calling card and a user account;
receiving a key code generated by the calling card, the key code being derived from key code information stored on the calling card using a personal identification number (PIN) associated with the user account;
verifying authorization for the call by validating the key code without the PIN being transmitted;
prompting for a telephone number; and
routing the call based on the telephone number.

9. The method of claim 8, wherein the key code information comprises a plurality of key codes associated with the PIN, and wherein the step of verifying comprises:
searching a database to verify that the key code is one of the plurality of key codes associated with the PIN.

10. The method of claim 8, wherein the key code information comprises a key code algorithm, and wherein the step of verifying comprises:
  recovering the PIN by executing an inverse of the key code algorithm using the key code as parametric input.

11. The method of claim 10, wherein the PIN is recovered using additional data in combination with the key code as parametric input.

12. The method of claim 8, wherein the request and the key code are received at a call processing center of a voice-over-internet-protocol (VoIP) service provider.

13. The method of claim 8, wherein the request for the call is received from a first endpoint and the telephone number is associated with a second endpoint, each of the first and second endpoints being coupled to a public switched telephone network (PSTN), and wherein the call is routed over a packet network.

14. A communication system, comprising:
  a first endpoint configured to provide a request for a call;
  a second endpoint;
  a calling card configured to generate a key code derived from key code information using a personal identification number (PIN) associated with a user account; and
  a call processing center configured to verify authorization for the call by validating the key code without the PIN being transmitted, to prompt for a telephone number of the second endpoint, and to rout the call from the first endpoint to the second endpoint.

15. The system of claim 14, further comprising:
  a packet network;
  wherein the call processing center routes the call through the packet network.

16. The system of claim 15, wherein the first endpoint and the second endpoint are each coupled to a public switched telephone network (PSTN).

17. The system of claim 14, wherein the calling card comprises:
  a planar card body having mounted thereon:
    a memory system configured to store the key code information;
    an input circuit configured to receive the PIN;
    a controller configured to derive the key code from the key code information using the PIN; and
    a display configured to present the key code.

18. The system of claim 17, wherein the key code information comprises a plurality of key codes associated with the PIN, and wherein the controller is configured to derive the key code by selecting one of the plurality of key codes.

19. The system of claim 17, wherein the key code information comprises a key code algorithm, and wherein the controller is configured to derive the key code by executing the key code algorithm using the PIN as parametric input.

20. The system of claim 17, wherein the planar card body further includes:
  a communication interface, coupled to the memory system, configured to receive the key code information for storage in the memory system.

* * * * *